US012679380B2

(12) United States Patent
Oh et al.

(10) Patent No.: US 12,679,380 B2
(45) Date of Patent: *Jul. 14, 2026

(54) METHOD FOR CONTROLLING DRIVING FORCE OF VEHICLE

(71) Applicants:Hyundai Motor Company, Seoul (KR); Kia Corporation, Seoul (KR)

(72) Inventors: Ji Won Oh, Hwaseong-Si (KR); Jeong Soo Eo, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 13 days.

This patent is subject to a terminal disclaimer.

(21) Appl. No.: 18/899,883

(22) Filed: Sep. 27, 2024

(65) Prior Publication Data

US 2025/0018950 A1 Jan. 16, 2025

Related U.S. Application Data

(63) Continuation-in-part of application No. 17/961,414, filed on Oct. 6, 2022, now Pat. No. 12,151,674.

(30) Foreign Application Priority Data

Nov. 3, 2021 (KR) ........................ 10-2021-0149821

(51) Int. Cl.
*B60W 10/04* (2006.01)
*B60W 30/18* (2012.01)
(52) U.S. Cl.
CPC ...... *B60W 30/18172* (2013.01); *B60W 10/04* (2013.01); *B60W 2520/18* (2013.01); *B60W 2520/266* (2013.01); *B60W 2520/30* (2013.01);

*B60W 2552/40* (2020.02); *B60W 2720/266* (2013.01); *B60W 2720/30* (2013.01)
(58) Field of Classification Search
CPC ........... B60W 30/045; B60W 2520/18; B60W 2530/10; B60W 2552/40; B60W 2720/406; B60W 30/18172; B60W 2520/125; B60W 2520/28; B60W 2540/18; B60W 2720/18; B60W 2720/30; B60W 40/068; B60W 40/112; B60W 40/12; B60W 2520/26; B60W 2520/30; B60W 2520/40; B60W 10/04; B60W 2520/266; B60W 2720/266; B60Y 2300/82
See application file for complete search history.

(56) References Cited

U.S. PATENT DOCUMENTS

| | | | |
|---|---|---|---|
| 11,505,073 B1 | 11/2022 | Oh | |
| 12,151,674 B2 * | 11/2024 | Oh | ................. B60W 30/18172 |
| 2008/0086251 A1 | 4/2008 | Lu | |

(Continued)

*Primary Examiner* — Tisha D Lewis
(74) *Attorney, Agent, or Firm* — MORGAN, LEWIS & BOCKIUS LLP

(57) ABSTRACT

A driving method of controlling a vehicle is provided to solve the problem of a repeated wheel slip and deterioration of wheel slip control performance due to a roll motion by controlling the driving force of a vehicle by reflecting vertical load information of tires in real time while the vehicle is turning, to a method that can solve the problem of a repeated wheel slip and deterioration of wheel slip control performance due to a roll motion by controlling the driving force of a vehicle by reflecting vertical load information of tires in real time while the vehicle is turning.

5 Claims, 8 Drawing Sheets

(56) References Cited

U.S. PATENT DOCUMENTS

| | | | |
|---|---|---|---|
| 2008/0183353 A1* | 7/2008 | Post | B60G 17/0195 |
| | | | 701/84 |
| 2013/0345917 A1 | 12/2013 | Ozaki | |
| 2014/0046568 A1* | 2/2014 | Kato | B60K 17/356 |
| | | | 701/84 |
| 2020/0088281 A1 | 3/2020 | Chen | |
| 2020/0324770 A1 | 10/2020 | Velazquez Alcantar | |
| 2023/0137189 A1 | 5/2023 | Oh | |

* cited by examiner

FIG. 2A

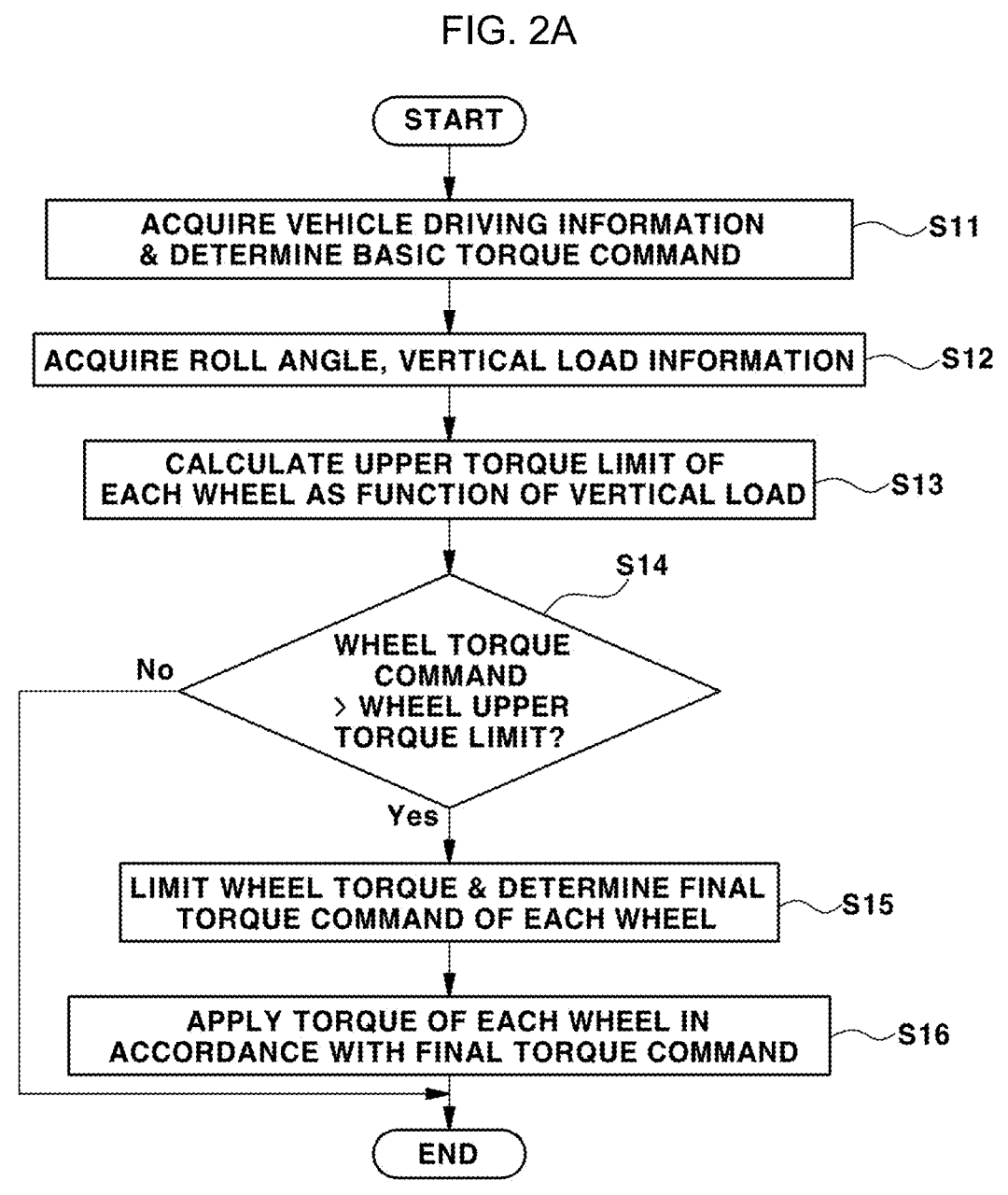

```
              ( START )
                  │
                  ▼
┌──────────────────────────────────────┐
│  ACQUIRE VEHICLE DRIVING INFORMATION   │──── S11
│   & DETERMINE BASIC TORQUE COMMAND     │
└──────────────────────────────────────┘
                  │
                  ▼
┌──────────────────────────────────────┐
│ ACQUIRE ROLL ANGLE, VERTICAL LOAD INFORMATION │──── S12
└──────────────────────────────────────┘
                  │
                  ▼
┌──────────────────────────────────────┐
│      CALCULATE UPPER TORQUE LIMIT OF    │──── S13
│  EACH WHEEL AS FUNCTION OF VERTICAL LOAD│
└──────────────────────────────────────┘
                  │
                  ▼            S14
               ╱  WHEEL TORQUE  ╲
       No    ╱     COMMAND        ╲
    ◄───────   > WHEEL UPPER
             ╲    TORQUE LIMIT?   ╱
               ╲               ╱
                  │ Yes
                  ▼
┌──────────────────────────────────────┐
│ LIMIT WHEEL TORQUE & DETERMINE FINAL   │──── S15
│   TORQUE COMMAND OF EACH WHEEL         │
└──────────────────────────────────────┘
                  │
                  ▼
┌──────────────────────────────────────┐
│    APPLY TORQUE OF EACH WHEEL IN       │──── S16
│ ACCORDANCE WITH FINAL TORQUE COMMAND   │
└──────────────────────────────────────┘
                  │
                  ▼
               ( END )
```

FIG. 2B

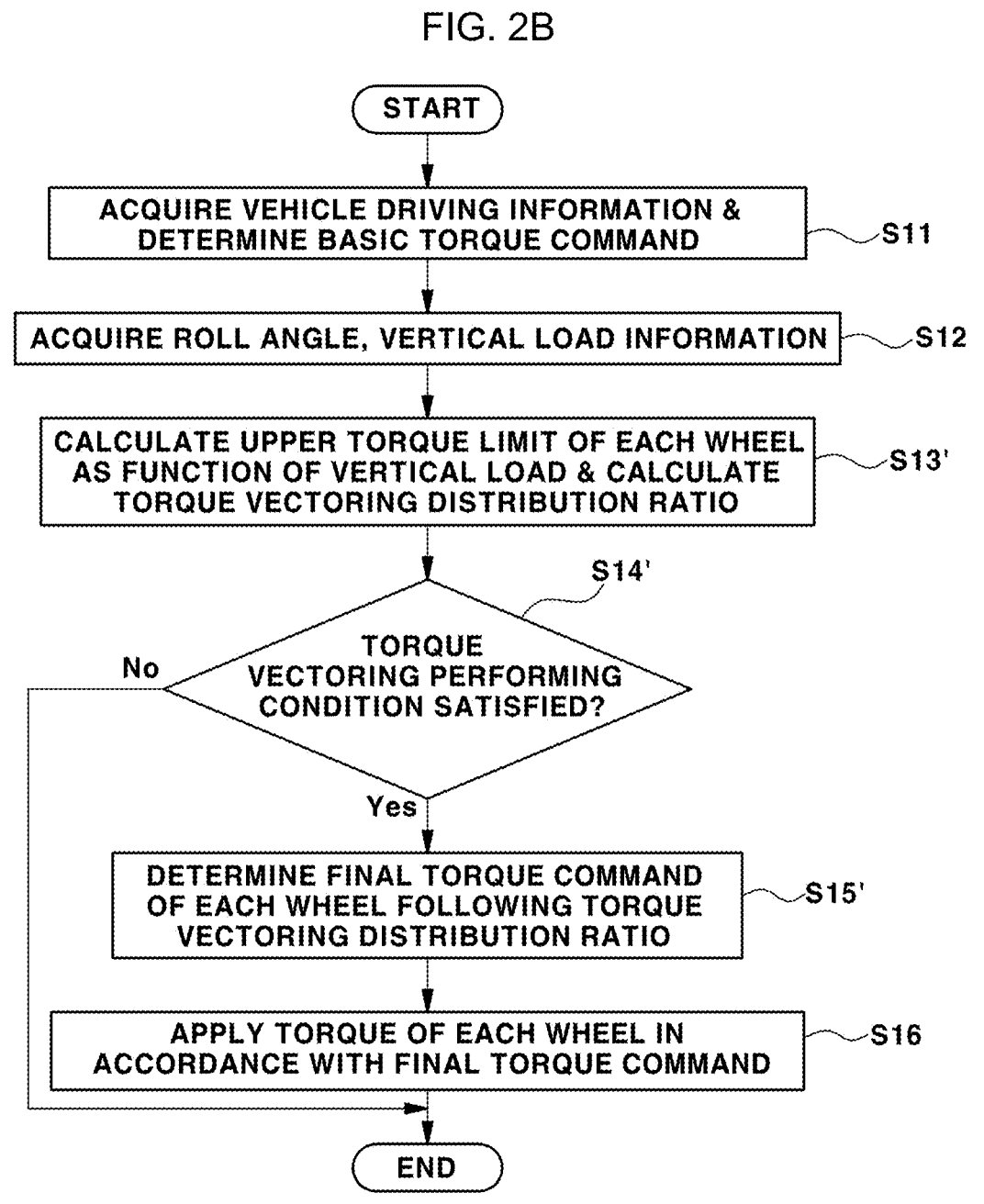

```
                    ┌─────────┐
                    │  START  │
                    └────┬────┘
                         │
      ┌──────────────────▼──────────────────┐
      │ ACQUIRE VEHICLE DRIVING INFORMATION &│────S11
      │   DETERMINE BASIC TORQUE COMMAND     │
      └──────────────────┬──────────────────┘
                         │
      ┌──────────────────▼──────────────────┐
      │ ACQUIRE ROLL ANGLE, VERTICAL LOAD INFORMATION │────S12
      └──────────────────┬──────────────────┘
                         │
      ┌──────────────────▼──────────────────┐
      │ CALCULATE UPPER TORQUE LIMIT OF EACH WHEEL │────S13'
      │  AS FUNCTION OF VERTICAL LOAD & CALCULATE  │
      │   TORQUE VECTORING DISTRIBUTION RATIO      │
      └──────────────────┬──────────────────┘
                         │            S14'
                    ◇────▼─────◇
              No   /   TORQUE     \
         ◄────────/ VECTORING PERFORMING \
                  \ CONDITION SATISFIED? /
                    ◇────┬─────◇
                         │ Yes
      ┌──────────────────▼──────────────────┐
      │ DETERMINE FINAL TORQUE COMMAND       │────S15'
      │ OF EACH WHEEL FOLLOWING TORQUE       │
      │ VECTORING DISTRIBUTION RATIO         │
      └──────────────────┬──────────────────┘
                         │
      ┌──────────────────▼──────────────────┐
      │   APPLY TORQUE OF EACH WHEEL IN      │────S16
      │ ACCORDANCE WITH FINAL TORQUE COMMAND │
      └──────────────────┬──────────────────┘
                         │
                    ┌────▼────┐
                    │   END   │
                    └─────────┘
```

STEERING ANGLE
TIRE PRESSURE
LATERAL/VERTICAL ACCELERATION
GYRO SENSOR INFORMATION (ROLL RATE)
WHEEL SPEED, DRIVING SYSTEM SPEED
SUSPENSION TRAVEL SENSOR INFORMATION

TRANSFER FUNCTION
PHYSICAL MODEL ML

ROLL ANGLE OR
VERTICAL LOAD

METHOD FOR CONTROLLING DRIVING FORCE OF VEHICLE

CROSS REFERENCE TO RELATED APPLICATION

The present application is a continuation-in-part application of U.S. patent application Ser. No. 17/961,414, filed Oct. 6, 2022, which claims priority to Korean Patent Application No. 10-2021-0149821, filed Nov. 3, 2021, the entire contents of which is incorporated herein for all purposes by this reference.

BACKGROUND OF THE PRESENT DISCLOSURE

Field of the Present Disclosure

The present disclosure relates to a method for controlling a driving force of a vehicle, and more particularly, to a method that can solve the problem of a repeated wheel slip and deterioration of wheel slip control performance due to a roll motion by controlling the driving force of a vehicle by use of vertical load information of tires in real time while the vehicle is turning.

Description of Related Art

Recently, even though various electronic control units are used for vehicles, the behavior of vehicles is limited finally due to the limitation of road surface friction force. This is because the behavior of vehicles depends on friction force between a road surface and tires thereon. Accordingly, how effectively friction force may be used is an important factor that determines the behavior of vehicles.

To effectively use friction force, it is important to control the driving force of wheels not to exceed the friction force that a road surface can provide. The friction force that a road surface can provide is generally influenced by the characteristics of the road surface, the amount of longitudinal/ lateral slips of tires, a vertical load on tires, etc. Of these factors, the vertical load on tires may be considered as the factor that mostly directly determines road surface friction force.

In general, electronic control units such as an Anti-lock Braking System (ABS) and a Traction Control System (TCS) are used as a method of using friction force to limit tire slip. However, the control types such as an ABS and a TCS have a defect that the slip control performance is not effective due to problems such as vehicle speed signal processing for preventing a control cycle delay or misoperation.

Recently, according to the trend of a wheel slip control strategy for electric vehicles that are driven by a motor, several methods that utilizes the torque and speed of a motor based on the quick behavior characteristics of motors rather than using actual vehicle speed (car body reference speed) and wheel speed have been provided.

Such a strategy has the advantage of not requiring an absolute speed or a reference speed of a vehicle, so it may be effective for an e-4WD (Four Wheel Drive) system. However, there may be limitation that a situation requiring driving force reduction control is repeated due to limitation of feedback control unless control that reflects first a roll motion of a vehicle, which is changed in real time, and vertical load information of tires which depends on the roll motion is not performed.

For example, while a vehicle is turning and a front-wheel driving force is generated, a roll is generated and lateral load movement is generated. That is, a roll is generated by the difference of the degrees of contraction or extension between the left-wheel suspension and the right-wheel suspension while a vehicle is turning, and lateral load movement is also generated in the vehicle.

Accordingly, an uneven slip of a tire is generated at the left wheels and right wheels of a vehicle. In the instant case, when a TCS is operated and reduces the driving force, a slip and a roll are decreased, so a vertical load of the tires of inner wheels may be secured. However, when the driving force is increased, a roll and lateral load movement are generated again, so an uneven slip of a tire may be generated again.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method that can solve the problem of a repeated wheel slip and deterioration of wheel slip control performance due to a roll motion by controlling the driving force of a vehicle by reflecting vertical load information of tires in real time while the vehicle is turning.

The objectives of the present disclosure are not limited to those described above and other objectives not stated herein would be understood by those who have ordinary skills in the art that the present disclosure belongs to (hereafter, 'those skilled in the art') from the following description.

To achieve the objectives, an exemplary embodiment of the present disclosure provides method for controlling a driving force of a vehicle, the method including: determining a basic torque command for a driving device configured to drive a vehicle by a control unit based on vehicle driving information which is obtained while the vehicle is traveling; obtaining real-time vertical load information of a left wheel and a right wheel of the vehicle while the vehicle is traveling based on information collected from the vehicle by the control unit; determining a final torque command of each wheel for applying torque to the left wheel and the right wheel from the determined basic torque command the obtained real-time vertical load information by the control unit; and controlling a torque vectoring apparatus including the driving device by the control unit so that corresponding torque for each wheel is applied to the left wheel and the right wheel in accordance with the final torque command for each wheel.

According to the method for controlling a driving force of a vehicle of the present disclosure, it is possible to prevent an excessive wheel slip and stably secure a lateral grounding force of a tire by performing torque vectoring control considering a lateral vertical load change before a slip is generated. Furthermore, it is possible to achieve a roll damping effect through the driving force control method considering a real-time vertical load change and roll dynamics. That is, roll overshoot (fluctuation) may be prevented. These effects of the present disclosure are increased in a Sports Utility Vehicle (SUV) in which the distance between the center of gravity and the roll center is large.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 2A and FIG. 2B are flowcharts showing a process of controlling a driving force according to an exemplary embodiment of the present disclosure;

Figure 1:
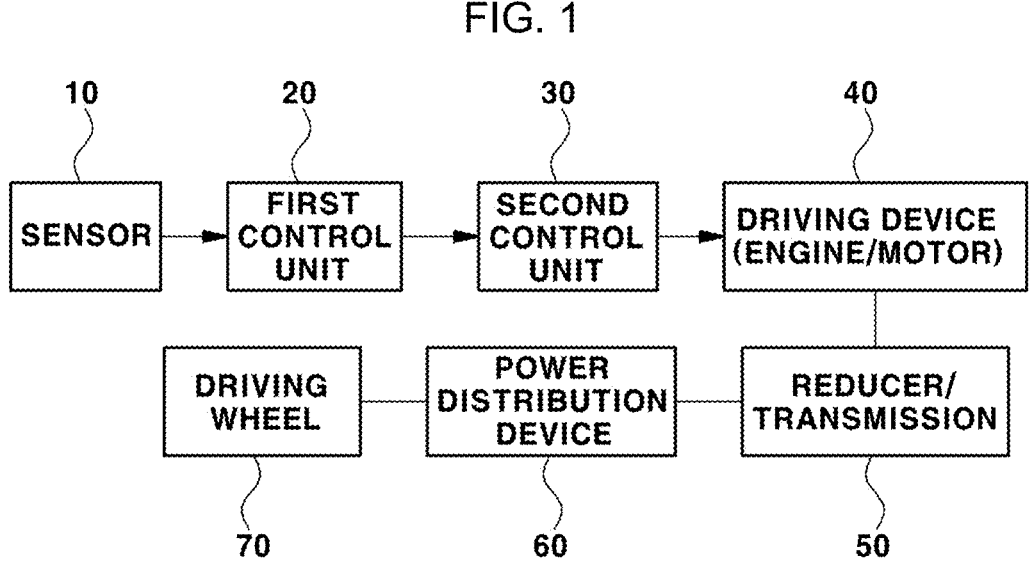
FIG. 1 is a block diagram showing the configuration of a system that performs driving force control according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Description of specific structures and functions included in embodiments of the present disclosure are only an example for describing the exemplary embodiments according to the concept of the present disclosure and the exemplary embodiments according to the concept of the present disclosure may be implemented in various ways. The present disclosure is not limited to the exemplary embodiments described herein and should be construed as including all changes, equivalents, and replacements that are included in the spirit and the range of the present disclosure.

It will be understood that, although the terms first and/or second, etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be directly connected to or directly coupled to another element or be connected to or coupled to another element, including the other element intervening therebetween. On the other hand, it is to be understood that when one element is referred to as being "directly connected to" or "directly coupled to" another element, it may be connected to or coupled to another element without the other element intervening therebetween. Furthermore, the terms used herein to describe a relationship between elements, that is, "between", "directly between", "adjacent" or "directly adjacent" may be interpreted in the same manner as those described above.

Like reference numerals indicate the same components throughout the specification. The terms used herein are provided to describe embodiments without limiting the present disclosure. In the specification, a singular form includes a plural form unless specifically stated in the sentences. The terms "comprise" and/or "including" used herein do not exclude that another component, step, operation, and/or element exist or are added in the stated component, step, operation, and/or element.

The present disclosure relates to a method for controlling a driving force of a vehicle, that is, provides a method that can solve the problem of a repeated wheel slip and deterioration of wheel slip control performance due to a roll motion by controlling the driving force of a vehicle by reflecting vertical load information of tires in real time while the vehicle is turning.

The control method for suppressing wheel slip in the related art is a feedback control method that corrects a driving force after wheel slip is generated. However, in the related art, vertical load information of a tire before wheel slip is generated or roll motion information of a vehicle and vertical load information of a tire before wheel slip is generated are used, and the magnitude of a driving force is adjusted to cope with a change of a vertical load of a tire in real time before wheel slip is generated.

A roll motion stated in the present disclosure may exclude a roll due to left and right inclination of a road surface. That is, a roll which is stated hereafter may be a concept considering only a suspension roll which is generated by the difference of the degrees of contraction or extension between a left-wheel suspension and a right-wheel suspension and a roll angle may be a suspension roll angle due to the difference of the degrees of contraction or extension between a left-wheel suspension and a right-wheel suspension.

The state in which a suspension roll is generated, for example, may be the state in which a stroke difference is generated between a left-wheel suspension and a right-wheel suspension, so that the left-wheel suspension is rebounded (extended) more than the right-wheel suspension, the right-wheel suspension is bumped (contracted) more than the left-wheel suspension, the right-wheel suspension is rebounded (extended) more than the left-wheel suspension, or the left-wheel suspension is bumped (contracted) more than the right-wheel suspension.

One of the direct factors that determine the limit of a grounding force between a road surface and a tire is a vertical load of a tire. The larger the vertical load of a tire, the larger the available grounding force, so wheel slip is difficult to be generated.

Furthermore, the smaller the vertical load of a vehicle, the smaller the available grounding force, which is vulnerable to generation of wheel slip.

There are many reasons that change the vertical load of a tire and it is difficult to control a driving force in consideration of all changes due to disturbance outside a vehicle. Accordingly, a change of the vertical load of a vehicle due to at least a roll motion may be considered in driving force control except for changes due to external disturbance.

A roll moment is generated due to the difference between the center of gravity and a roll center of a vehicle while the vehicle is turning, and a roll motion of the vehicle is increased. Accordingly, a roll angle is generated by suspensions and the dynamic characteristics of the vehicle body. In general, a roll angle is generated in the opposite direction to the turning direction of a vehicle due to suspension inertia of the vehicle and the vehicle body is inclined, and in the instant case, the suspensions of the vehicle are contracted and extended by a roll motion.

The springs or dampers of the suspensions are changed in position, which influences the vertical load of tires. That is, lateral load movement is generated in the opposite direction to a turning direction in a vehicle, so that the vertical load of the turning-inner wheels decreases and the vertical load of the turning-outer wheels increases.

Vertical loads of tires that are changed in the instant way change the limit of a grounding force together with a roll motion. Accordingly, by setting the limit of a driving force first in consideration of the present phenomenon and correspondingly performing torque vectoring control, it is possible to take measures for reducing torque in advance before wheel slip is generated.

Furthermore, considering the characteristic that the maximum lateral grounding force of a tire is inversely proportional to the lateral slip amount of a tire, lateral stability can also be secured by a wheel slip prevention effect. Furthermore, a roll angle change due to start and end of TCS control may be suppressed by an effect of preventing a wheel slip, so a roll damping effect may be achieved.

In the following description, an inner wheel of a vehicle is one of a left wheel and a right wheel and an outer wheel is the other one of the left wheel and the right wheel, in which, as for the 'inner' and the 'outer', the side where a vertical load (vertical drag) is larger or the vertical load increases of the left side and the right side is defined as the 'outer' side and the side where a vertical load is minimum or the vertical load decreases of the left side and right side is defined as the 'inner' side in consideration of lateral load movement of a vehicle regardless of the turning direction of the vehicle.

Embodiments of the present disclosure will be described hereafter in detail with reference to the drawings.

FIG. 1 is a block diagram showing the configuration of a system that performs control according to an exemplary embodiment of the present disclosure, in which a configuration that controls a driving force of a vehicle is shown. FIG. 2A and FIG. 2B are flowcharts showing a process of controlling a driving force according to an exemplary embodiment of the present disclosure.

A driving force stated herein is a force which is generated by a driving device 40 configured for driving a vehicle, and may be the sum of forces acting between the tires of driving wheels and a road surface. That is, the driving force may include a force which is generated at the driving wheels 70 by the driving force 40 and the force which is generated at the driving wheels 70 may be force generated by torque which is applied to the driving wheels 70 by the driving device 40 (e.g., a motor) that drives the vehicle.

For example, when the driving device 40 of a vehicle is a motor, the torque which is applied to the driving wheels 70 is driving torque which is output by the motor when the motor is driven or regenerative braking torque which is generated by the motor in regenerating. In the instant case, the driving force is a concept including not only a driving force by the torque output from the motor when the motor is driven, but a regenerative braking force in generating of the motor.

Control of a driving force may be performed by controlling torque of the driving device 40, and in the instant case, the torque mean both driving torque by motor as torque, which is applied to the driving wheels 70, and regenerative braking torque by the motor. In the following description, 'torque' and 'torque command may be replaced with 'driving force' and 'driving force instruction'.

In the method of controlling a driving force according to an exemplary embodiment of the present disclosure, an apparatus that implements torque vectoring in a vehicle, that is, a torque vectoring apparatus is used. Control of a driving force according to an exemplary embodiment of the present disclosure may perform individual control of the driving forces (including regenerative braking force) that are applied to a left wheel and a right wheel, respectively, using the torque vectoring apparatus. Control of a driving force according to an exemplary embodiment of the present disclosure may include control for distributing a driving force to a left wheel and a right wheel using the torque vectoring apparatus.

A vehicle to which the control of a driving force according the present disclosure is a vehicle in which torque vectoring control may be performed and provided with the torque vectoring apparatus. The torque vectoring apparatus is not specifically limited as long as it has a configuration that can control a driving force which is applied or distributed to a left wheel and a right wheel.

For example, the torque vectoring apparatus may be an automotive powertrain system that can independently drive a left wheel and a right wheel, and in detail, may include wheel motors that can drive a left wheel and right wheel, respectively. The motor may be an in-wheel motor or an in-hub motor mounted for each of a left wheel and a right wheel. The torque vectoring apparatus a dual motor system including a motor configured for driving a left wheel and a motor configured for driving a right wheel, and in the instant case, a reducer which is a power transmission device may be provided between each motor and a wheel.

Alternatively, the torque vectoring apparatus in the present disclosure may include one driving device and a power distribution device 60 that can distribute and transmit torque by the driving device to a left wheel and a right wheel in accordance with a power transmission ratio which is determined in accordance with driving situations by a control logic. The driving device may be an engine or a motor. It should be understood that the driving force in the present disclosure is a meaning that includes a regenerative braking force when the vehicle is an electric vehicle which is driven by a motor, as described above.

The wheels (driving wheels) at which torque vectoring control is performed are a left wheel and a right wheel in the above description, but it would be understood by those skilled in the art that one of the left wheel and the right wheel is an inner wheel and the other one is an outer wheel while a vehicle is turning. Torque vectoring while a vehicle is turning in the present disclosure may mean individual control of driving forces that are applied to the inner wheel and the outer wheel.

An apparatus of controlling a driving force of the present disclosure includes: a first control unit 20 that determines a basic torque command from vehicle driving information obtained while the vehicle is traveling; a second control unit 30 that controls the operation of a driving device 40 in accordance with a final torque command received from the first control unit 20; and the driving device 40 which is a driving source for driving the vehicle and of which the operation is controlled by the second control unit 30.

The first control unit 20 determines a basic torque command in real time from the vehicle driving information and determines in real time torque command for a left wheel and a right wheel (an inner wheel and an external wheel) from the determined basic torque command using a power distribution ratio determined by a predetermined torque vectoring control logic.

Furthermore, the first control unit 20 obtains real-time vertical load information of the left wheel and the right wheel while the vehicle is traveling based on information collected from the vehicle, and determines a real-time upper torque limit for each wheel, that is, upper torque limits of the left wheel and the right wheel from the obtained real-time vertical load information.

Furthermore, the first control unit 20 determines a final left-wheel torque command and right-wheel torque command that are limited not to exceed the upper torque limits of the corresponding wheels from the torque commands of the left wheel and the right wheel by comparing the determined torque commands of the left wheel and the right wheel with the determined upper torque limit for each wheel (driving wheel). The first control unit is configured to control the torque vectoring apparatus so that the torque which is applied to the left wheel and the right wheel may be controlled in accordance with the determined final left-wheel torque command right-wheel torque command.

When the vehicle is provided with a motor configured for each wheel as the driving device 40, the first control unit 20 outputs the determined final left-wheel torque command and right-wheel torque command to the second control unit 30. The second control unit 30 controls the individual motors that are the driving devices 40 in accordance with the final left-wheel torque command and right-wheel torque command output from the first control unit 20, and torque and a rotation force applied by each motor is transmitted to each corresponding wheel.

Alternatively, when the vehicle is provided with a motor configured for each wheel as the driving device 40, the first control unit 20 may be set to determine the power distribution ratio of the left wheel and the right wheel from the vertical load information of the left wheel and the right wheel which is obtained in real time or the upper torque limits of the left wheel and the right wheel which are obtained in real time, and to determine left-wheel torque and right-wheel torque distributed from the basic torque command in accordance with the determined power distribution ratio.

The first control unit 20 outputs the determined left-wheel torque command and right-wheel torque command to the second control unit 30, and the second control unit 30 controls the individual motors that are the driving devices 40 in accordance with the left-wheel torque command and right-wheel torque command output from the first control unit 20.

Alternatively, when the vehicle is provided with one driving device 40, the first control unit 20 transmits the basic torque command to the second control unit 30 as a final torque command and the second control unit 30 controls the motor in accordance with the final torque command received from the first control unit 20.

The first control unit 20 controls the operation of the power distribution device 60 that distributes power to the left wheel and the right wheel in accordance with the power distribution ratio determined by the control logic so that torque from the driving device distributed in accordance with the power distribution ratio to the left wheel and the right wheel. The power transmission ratio may be determined based on the real-time vertical load information of the left wheel and the right wheel, as described below.

The basic torque command is determined and generated by the first control unit 20 based on real-time vehicle driving information obtained through a driving information detector while the vehicle is traveling, the driving information detector may include a sensor 10, and the vehicle driving information may be sensor detection information which is detected by the sensor 10 and input to the first control unit 20 through a vehicle network.

The sensor 10 that detects vehicle driving information may include an accelerator position sensor (APS) that detects an accelerator pedal input value by a driver, a brake pedal position sensor (BPS) that detects a brake pedal input value by a driver, a sensor that detects a driving system speed, and a sensor that detects a vehicle speed.

The driving system speed may be the rotation speed of the driving device 40 or the rotation speed of the driving wheels 70 (a wheel speed). The driving device 40 may be an engine or a motor and the rotation speed of the driving device may be a rotation speed of an engine (am engine speed) or the rotation speed of a motor (a motor speed). The sensor that detects a driving system speed may be a sensor that detects an engine speed or a motor speed, and the sensor that detects a motor speed may be a resolver that detects the position of the rotor of a motor. Alternatively, the sensor that detects a driving system speed may be a wheel speed sensor that detects the rotation speed of the driving wheels 70 (a wheel speed).

The sensor that detects a vehicle speed may also be a wheel speed sensor. It is well known in the field of the art that vehicle speed information is obtained from a signal of the wheel speed sensor, so it is not described in detail.

As the vehicle driving information which is detected by the sensor 10 to determine and generate the basic torque command, an accelerator pedal input value by a driver (an APS value), a brake pedal input value by a driver (a BPS value), the speed (rotation speed) of the driving device 40, a vehicle speed, etc. may be selectively used. In the vehicle driving information, the accelerator pedal input value and the brake pedal input value may be input information by a driver, and the speed of the driving device 40 and the vehicle speed that are detected by a sensor may be vehicle state information.

Alternatively, the vehicle driving information may be information which is determined by the first control unit 20 itself or may be information (e.g., required driving force information) which is input to the first control unit 20 through the vehicle network from another control unit (e.g., an ADAS control unit) in the vehicle. The first control unit 20 may be an upper control unit that generates a basic torque command based on vehicle driving information in common vehicles, for example, a vehicle control unit (VCU) or a hybrid control unit (HCU).

In an exemplary embodiment of the present disclosure, the sensor 10 may further include a sensor that detects a steering angle by operation of a steering wheel by a driver and a suspension sensor that obtained suspension roll angle information which is roll motion information of a vehicle.

The sensor that detects a steering angle which is one of steering input values by a driver may be a common steering angle sensor. The suspension sensor that obtains suspension roll angle information may include a travel sensor of a left-wheel suspension and a travel sensor of a right-wheel suspension. Well-known methods may be used in a process of obtaining suspension roll angle information from the information which is detected by the suspension sensor. For example, it is possible to determine suspension roll angle information of the vehicle in real time by comparing the positions of the left wheel and the right wheel based on signals from the travel sensors.

Furthermore, as described above, a suspension roll angle, etc. may be obtained through a determined estimation process based on information collected from a vehicle through sensors, and the estimation method is well known to those skilled in the art, so it is not described in detail.

The second control unit 30, which is a control unit that receives the final torque command output from the first control unit 30 and controls the operation of the driving device 40 in accordance with the received final torque command, may be a motor control unit (MCU) that operates a motor and controls operation of the motor through an inverter in accordance with a torque command when the driving device 40 is a motor.

In the present disclosure, the first control unit 20 adjusts the magnitude of a driving force while a vehicle is turning, and utilizes vertical load information of tires, or vertical information of tires and roll motion information (suspension roll angles) to control the driving force. The vertical load of a tire (hereafter, abbreviated as 'vertical load) and the suspension roll angle (hereafter, abbreviated as a 'roll angle') may be determined through a transfer function, and example of determining them using a transfer function is described hereafter.

Figure 3:
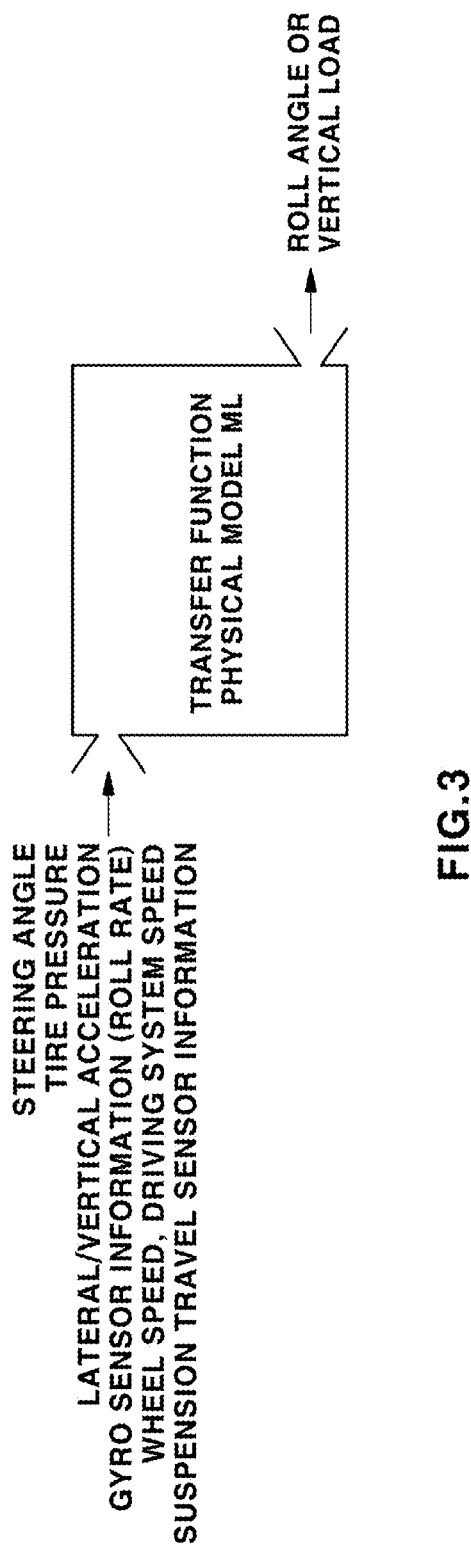
FIG. 3 is a view showing that a vertical load and a roll angle may be determined through a transfer function in the present disclosure.

FIG. 3 is a diagram showing that a roll angle and a vertical load may be determined through a transfer function including information collected from a vehicle as input. In an exemplary embodiment of the present disclosure, a transfer function which is set in the first control unit 20 may have the following form.

First, a transfer function including steering angle and vehicle speed information as input and roll angle information as output and a transfer function including roll angle information as input and vertical load information as output may be used.

Alternatively, a transfer function including steering angle and vehicle speed information detected by a sensor and including vertical load information as output and a transfer function including tire pressure information detected by a tire pressure sensor as input and including vertical load information as output may be used.

Alternatively, a transfer function including information detected by a lateral acceleration sensor or vertical acceleration sensor provided in a vehicle as input and including roll angle or vertical load information as output may be used. Alternatively, a transfer function including roll angle change rate (roll rate) information obtained by a gyro sensor (a roll rate sensor) as input and including vertical load information as output may be used.

Alternatively, a transfer function including information of a wheel speed sensor or other driving system speed sensors as input and including roll angle or vertical load information as output may be used. The driving system speed may be a driving device speed (an engine speed or a motor speed) or a driveshaft speed.

Alternatively, a transfer function including information detected by a suspension travel sensor as input and including roll angle or vertical load information as output may be used. Alternatively, a transfer function including two or more of the items of information described above as input and including roll angle or vertical load information as output may be used.

The transfer function stated herein may be a transfer function set to determine a roll angle or a vertical load using a data-based optimization technique, numerical solution, etc. Alternatively, a physical model-based transfer function may be constructed and used and a learning technique for obtaining a transfer function may be used. Alternatively, the algorithms including input and output described above may be constructed using various machine learning (ML) techniques other than a transfer function.

FIG. 2A and FIG. 2B show a driving force control process according to an exemplary embodiment of the present disclosure. First, in the exemplary embodiment of FIG. 2A, real-time vehicle driving information is obtained by the first control unit 20 and a basic torque command is determined based on the obtained vehicle driving information, as described above (S11).

When steering is input by a user, a steering angle which is a steering input value is detected by the sensor 10, and then, the driving force control process in turning according to an exemplary embodiment of the present disclosure is performed. For driving force control in turning, the first control unit 20 obtains real-time roll motion information and vertical load information, as described above (S12).

While the vehicle is traveling, the first controller 20 determines left-wheel and right-wheel torque commands in real time from the determined basic torque command in accordance with a power distribution ratio for the left wheel and the right wheel determined by the control logic.

After obtaining the roll motion information and vertical load information, the first control unit 20 determines in real time an upper torque limit for each wheel (each driving wheel), that is, the upper torque limits of the left wheel and the right wheel (or the upper torque limits of the inner wheel and the outer wheel) based on the vertical load information, or the vertical load information and roll motion information (S13). In an exemplary embodiment of the present disclosure, the first control unit 20 can determine an upper torque limit for each wheel as a function of a vertical load. For example, the first control unit 20 can determine an upper torque limit for each wheel which is proportioned to a vertical load.

Therefore, the first control unit 20 limits a torque command for each wheel not to exceed the upper torque limit for each wheel by comparing the torque command for each wheel with the upper torque limit for each wheel. The first control unit 20 corrects the torque command for each wheel only under the condition that the torque command for each wheel exceeds the upper torque limit for the corresponding wheel, and the corrected torque command (which is a final torque command) becomes the upper torque limit of the corresponding wheel. The first control unit 20 enables torque corresponding to the corrected torque command (post-correction torque command) to be applied to the corresponding to wheel.

If the torque command of the wheel with a small vertical load of the left wheel and the right wheel, that is, the inner wheel exceeds the inner-wheel upper torque limit and the torque command of the inner wheel is limited to the inner-wheel upper torque limit (which is the post-correction inner-wheel torque command, that is, the final inner-wheel torque command) while the vehicle is turning, the outer-wheel torque command may also be corrected by adding a decrease (a correction amount) of the inner-wheel torque command to the outer-wheel torque command.

The decrease of the inner-wheel torque command may be the difference between the pre-correction inner-wheel torque command and the inner-wheel upper torque limit (which is the post-correction inner-wheel torque command), and the post-correction outer-wheel torque command (which is the final outer-wheel torque command) may be the sum of the pre-correction outer-wheel torque command and the decrease of the inner-wheel torque command.

Figure 4:
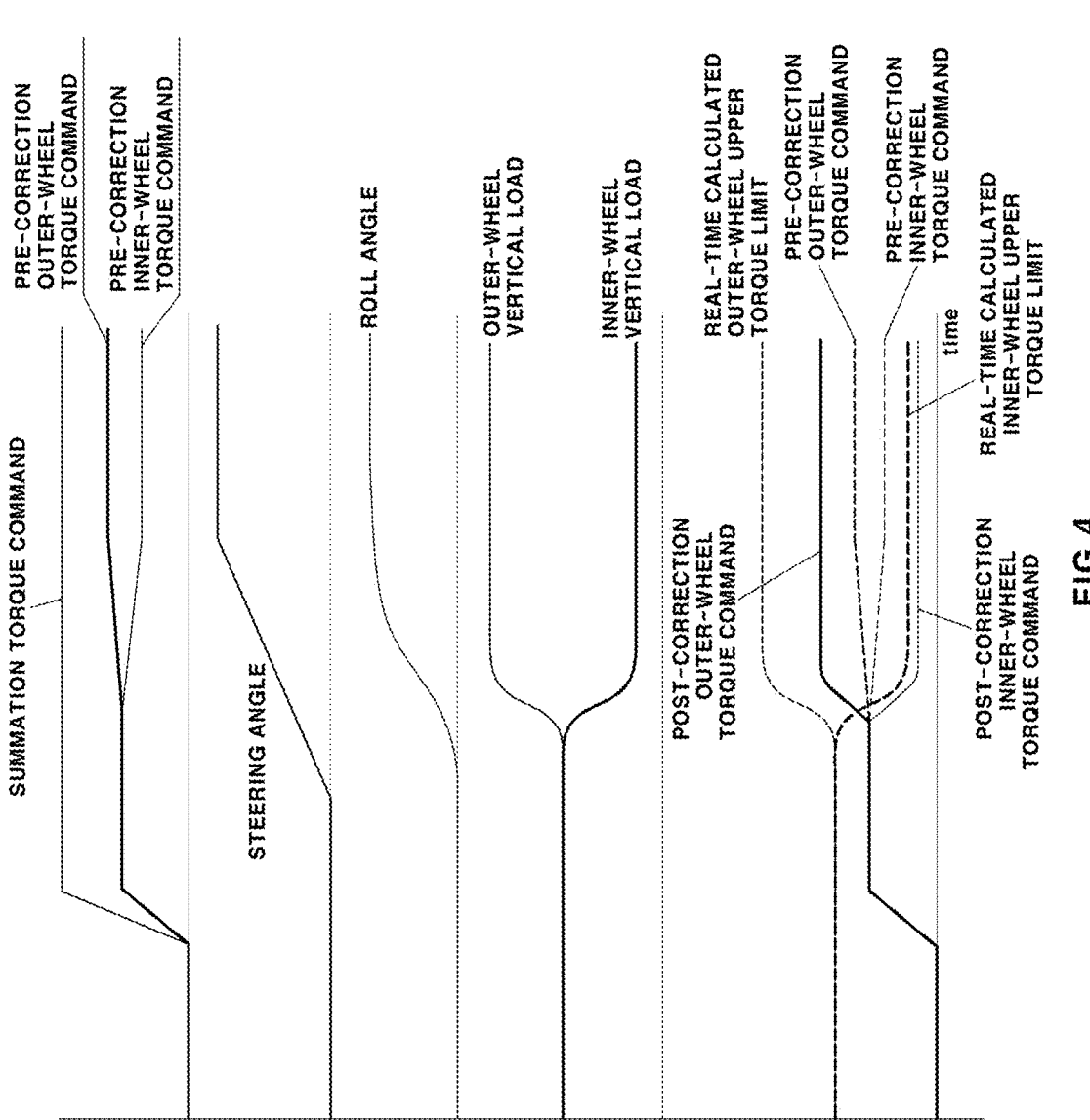
FIG. 4 is a view showing an example of comparing a wheel slip control state of the related art and a control state of the present disclosure with each other.

The sum of the post-correction inner-wheel torque command and the post-correction outer-wheel torque command may be the same as the sum of the pre-correction inner-wheel torque command and the pre-correction outer-wheel torque command, and both of the sums may be the basic torque command values (see FIG. 4).

For example, in more detail, the distributed left-wheel torque command and the left-wheel upper torque limit are compared (S14), a final left-wheel torque command limited not to exceed the left-wheel upper torque limit is determined from the left-wheel torque command (S15) and the torque which is actually applied to the left wheel is controlled in accordance with the determined final left-wheel torque command (torque command following control is performed) (S16). When motors are mounted for wheels, respectively, as the driving device 40, the motor of the left wheel is controlled to generate torque corresponding to an instruction value in accordance with the determined final left-wheel torque command.

While the vehicle is turning left, the left wheel (inner-turning wheel) may be the inner wheel with a small vertical load, and in the instant case, when the left-wheel torque command exceeds the left-wheel upper torque limit, the left-wheel torque command may be determined and limited as the left-wheel upper torque limit. That is, the post-correction left-wheel torque command (the final left-wheel torque command) is the left-wheel upper torque limit. In the instant case, the decrease (the correction amount) of the left-wheel torque command is the difference between the pre-correction left-wheel torque command and the post-correction left-wheel torque command (the left-wheel upper torque limit), and the post-correction right-wheel torque command (the final right-wheel torque command) is determined by adding the decrease to the pre-correction right-wheel torque command (see FIG. 4).

Similarly, the distributed right-wheel torque command and the right-wheel upper torque limit are compared (S14), a final right-wheel torque command limited not to exceed the right-wheel upper torque limit is determined from the right-wheel torque command (S15) and the torque which is actually applied to the right wheel is controlled in accordance with the determined final right-wheel torque command (torque command following control is performed) (S16). When motors are mounted for wheels, respectively, the motor of the right wheel is controlled to generate torque corresponding to an instruction value in accordance with the determined final right-wheel torque command.

While the vehicle is turning right, the right wheel (inner-turning wheel) may be the inner wheel with a small vertical load, and in the instant case, when the right-wheel torque command exceeds the right-wheel upper torque limit, the right-wheel torque command may be determined and limited as the right-wheel upper torque limit. That is, the post-correction right-wheel torque command (the final right-wheel torque command) is the right-wheel upper torque limit. In the instant case, the decrease (the correction amount) of the right-wheel torque command is the difference between the pre-correction right-wheel torque command and the post-correction right-wheel torque command (the left-wheel upper torque limit), and the post-correction left-wheel torque command (the final left-wheel torque command) is determined by adding the decrease to the pre-correction left-wheel torque command (see FIG. 4).

Meanwhile, in the exemplary embodiment of FIG. 2B, step S11 and step S12 are not different from those of the exemplary embodiment of FIG. 2A, and similarly, a left-wheel upper torque limit and a right-wheel upper torque limit are determined based on vertical load information, or vertical load information and roll motion information in S13.

Furthermore, the first control unit 20 determines a torque vectoring distribution ratio, that is, a left and right power distribution ratio for torque vectoring from the vertical load information of the left wheel and the right wheel or the upper torque limit information of the left wheel and the right wheel (S13'), checks whether predetermined torque vectoring conditions are satisfied as in a common case (S14'), and when they are satisfied, performs torque vectoring control on the left wheel and the right wheel in accordance with the power distribution ratio.

In the instant case, the torque commands of the left wheel and the right wheel are determined by distributing the basic torque command in accordance with the determined power distribution ratio (S15'), and then the torque vectoring apparatus is controlled so that torque corresponding to the determined torque command for each wheel (which is the final torque command) may be applied to the corresponding wheel (S16).

FIG. 4 is a view showing an example of comparing a driving force control state of the related art and a driving force control state of the present disclosure with each other. FIG. 4 shows that an upper torque limit for each wheel is determined in real time from vertical load information for each wheel for driving force control according to an exemplary embodiment of the present disclosure and that the upper torque limit of each wheel is determined as a value which is proportioned to the vertical load of the corresponding wheel.

Furthermore, FIG. 4 shows that the pre-correction inner-wheel torque command and the pre-correction outer-wheel torque command that are distributed from a basic torque command in accordance with a power transmission ratio are corrected not to exceed the upper torque limits of the corresponding wheel, as described with reference to FIG. 2A. The corrected toque instructions, that is, both the post-correction inner-wheel torque command and the post-correction outer-wheel torque command do not exceed the upper torque limits.

The subject of control is divided as the first control unit and the second control unit in the above description, but the control process according to an exemplary embodiment of the present disclosure may be one integrated control element instead of a plurality of control units. A plurality of control units and one integrated control element may be, in combination, referred to as a control unit and the control process of the present disclosure to be described hereafter may be performed by the control unit. That is, the control unit may be a term including the first control unit and the second control unit.

In general, the operation (including motor regeneration) of a driving device (an engine or a motor) is controlled in accordance with a torque command while a vehicle is traveling, and a torque output the driving device in the instant case (not regenerative torque, but driving torque) can accelerate the vehicle. When a steering wheel is operated by a driver while the vehicle is traveling at a predetermined speed by the torque from the driving device, the vehicle is turned.

Turning of the vehicle is performed in accordance with a steering angle which is a steering input value by the driver, and while the vehicle is turning, a roll angle is generated by lateral dynamics and the vertical loads at the left wheel and the right wheel are changed. This may be understood as lateral load movement, and when a vehicle is normally turned, the vertical load (vertical drag) applied to the inner wheel decreases in comparison to straight driving and the vertical load applied to the outer wheel increases in comparison to straight driving.

The vertical loads at the left wheel and the right wheel in turning are not simply decreased or increased, but the change pattern may be varied by the dynamic characteristics such as the suspension, roll stabilizer, vehicle body, etc. of the vehicle. In in accordance with the change of the vertical load in the transition state, the wheel speed of the driving wheels may cause the phenomenon that slip is instantaneously generated, removed, and then generated again.

Wheel slip control may not be made well and a considerable amount of slip may be generated due to the present phenomenon, and wheel slip may cause a severe loss of grounding force and instability in the lateral direction due to the characteristics of common tires that the lateral grounding force is inversely proportioned to the lateral wheel slip amount. The present characteristic may be understood as a limit that necessarily requires corresponding feedback control after wheel slip is generated.

However, in the present disclosure, it is possible to know tire vertical load information at a left wheel and a right wheel through a transfer function or model, or learning or a machine leaning technique, and it is possible to prevent wheel slip by correcting and control torque for each wheel in real time based on the information. Accordingly, the wheel slip control of the related art is not required. Furthermore, because it is possible to know in real time a vertical load related to a roll motion, and an upper torque limit for each wheel which is proportioned to the vertical load, it is possible to keep the torque at each wheel lower than the upper torque limit of each wheel (see FIG. 4).

A driving force control method which is performed by a controller is described in more detail hereafter.

In the present disclosure, a control unit is configured to determine an upper torque limit for each wheel based on vertical load information (S13 in FIG. 2A) and controls the torque applied to each wheel not to exceed the determined upper torque limit of each wheel. When a torque command for each wheel determined to satisfy a real-time basic torque command exceeds the real-time determined upper torque limits, the torque command for each wheel is corrected and post-correction torque commands not exceeding the upper torque limits are used as final torque commands.

The upper torque limit may be determined from real-time vertical load (vertical drag) information of the corresponding wheel determined through the transfer function by the control unit. In the instant case, upper torque limits proportioned to the vertical load information of the inner wheel and the outer wheel are determined, and the torque of each wheel is controlled not to exceed the upper torque limit of each wheel when torque vectoring control is performed.

That is, when the inner-wheel vertical load decreases and the outer-wheel vertical load increases due to lateral load movement, the inner-wheel torque should be set to change with the upper torque limit determined based on the decreased inner-wheel vertical load and the outer-wheel torque should be set to change with the upper torque limit determined based on the increased outer-wheel vertical load.

The following Equations 1 and 2 are examples for determining an upper torque limit of each wheel using the vertical load information of each wheel.

$$\text{inner-wheel upper torque limit} = \sigma_0 \times \sigma_1 \times \quad \text{[Equation 1]}$$
$$\text{min(left-wheel vertical load, right-wheel vertical load)}$$

$$\text{outer-wheel upper torque limit} = \sigma_0 \times \sigma_1 \times \quad \text{[Equation 2]}$$
$$\text{max(left-wheel vertical load, right-wheel vertical load)}$$

As in Equation 1, the inner-wheel upper torque limit is determined using the small one (minimum value) of the left-wheel vertical load and the right-wheel vertical load, and as in Equation 2, the outer-wheel upper torque limit is determined using the larger one (maximum value) of the left-wheel vertical load and the right-wheel vertical load.

In Equations 1 and 2, the left-wheel vertical load and the right-wheel vertical load may be the sum of the left and right front-wheel vertical loads and the sum of the left and right rear-wheel vertical loads, respectively, and may be sums of the left and right driving wheels, respectively. For example, the left-wheel vertical load may be the sum of the vertical load of the left front wheel and the vertical load of the left rear wheel. It is possible to determine an upper torque limit of each wheel by dividing the inner-wheel upper torque limit and the outer-wheel upper torque limit determined from Equations 1 and 1 by the number of the driving wheels at each side.

Furthermore, when a vehicle is a front-wheel driving vehicle, an upper torque limit may be determined in consideration of only the vertical loads of the left wheel and the right wheel on the front axle, and when a vehicle is a rear-wheel driving vehicle, an upper torque limit may be determined in consideration of only the vertical loads of the left wheel and the right wheel on the rear axle.

In Equations 1 and 2, $\sigma_0$ is a coefficient which is set in advance to change vertical load information into an upper torque limit, that is, to correct and standardize the units of a vertical load (N) and torque (N·m). Furthermore, $\sigma_1$ is a parameter related to the information of the maximum road surface friction coefficient of the road on which the vehicle is traveling. If there is no maximum road surface friction coefficient in the vehicle when determining an upper torque limit, $\sigma_1$ may not be used.

However, when there is a maximum road surface friction coefficient, the control unit may adjust the upper torque limit in accordance with the maximum road surface friction coefficient using $\sigma_1$, as in Equations 1 and 2. That is, the control unit can determine a maximum friction coefficient security ratio (%) to a high-friction road surface for the driving road surface, and can determine an upper torque limit, as in Equations 1 and 2, using the determined maximum friction coefficient security ratio (%) as $\sigma_1$.

As for the maximum friction coefficient security ratio (%) to a high-friction road surface, the high-friction road surface, generally, may be asphalt pavement and the maximum friction coefficient of dry asphalt pavement which is a high-friction road surface is about 0.9~1. Accordingly, the maximum friction coefficient of a high-friction road surface may be set and used as 1 which is the maximum fiction coefficient of dry asphalt pavement.

A sandy or wet road surface, and a slippery road surface such as a snowy road are low-friction road surfaces, and the maximum friction coefficients of these low-friction road surfaces are lower than that of the high-friction road surface. For example, when the maximum friction coefficient of a driving road surface is driven is 0.3, the maximum friction coefficient security ratio of the driving road surface to a high-friction road surface of which the maximum friction coefficient is 1 is 30%. As described above, the maximum friction coefficient security ratio of a driving road surface to a high-friction road surface may be defined as a percentage of the maximum friction coefficient of the driving road to the maximum friction coefficient of a high-friction road surface which is set in advance.

Furthermore, an upper torque limit is determined by multiplying the maximum friction coefficient of a high-friction road surface by the maximum friction coefficient security ratio of the driving road surface, as described above, that is, when the maximum friction coefficient security ratio of the driving road surface is 30% ($\sigma_1$=0.3), an upper torque limit may be determined by multiplying the maximum friction coefficient of a high-friction road surface by 0.3 (=30%).

Figure 5:
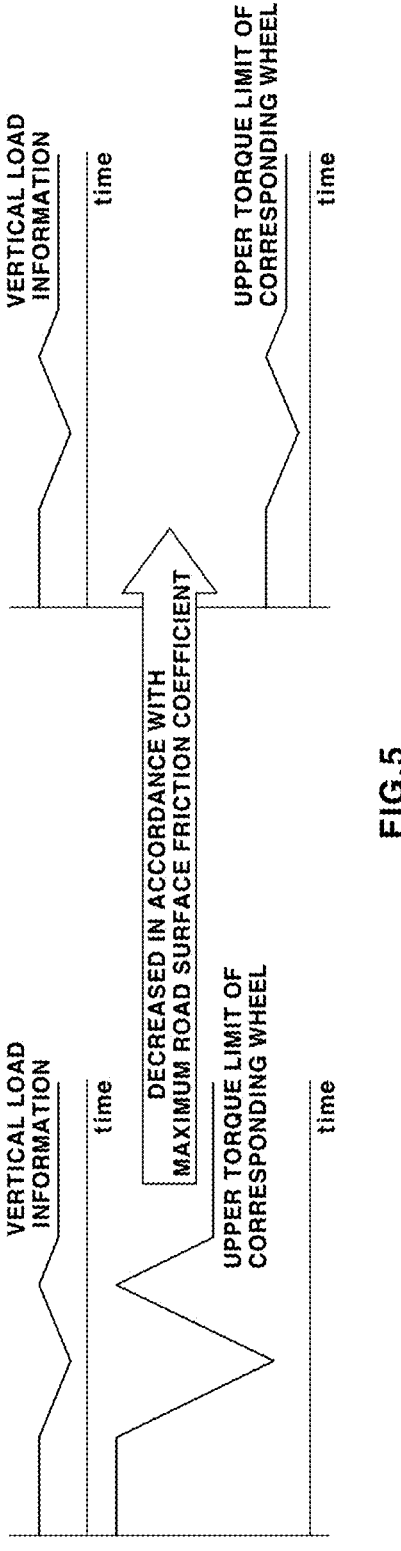
FIG. 5 is a view showing an example in which an upper torque limit is adjusted in accordance with a maximum road surface friction coefficient in the present disclosure.

There is a method of determining the friction coefficient of a road surface on which a vehicle is traveling based on the information of an image taken by a camera of the vehicle. As described above, since the parameter ($\sigma_1$) related to the information of the maximum friction coefficient of a road surface is used in Equations 1 and 2 in the present disclosure, the upper torque limit which is actually used may be adjusted in accordance with the maximum friction coefficient of a road surface even if the same vertical load is applied, as shown in FIG. 5.

Equations 1 and 2 are equations of determining an upper torque limit reflecting only the vertical load information of each wheel in turning. However, it is possible to determine and use an upper torque limit considering a roll angle $\varphi$, which is real-time roll motion information of a vehicle, and a roll angle change rate (a roll rate) p obtained from the roll angle. The roll angle change rate information, similar to the roll angle or the vertical load information, may be obtained from a transfer function or may be obtained by differentiating the roll angle. The following Equations 3 and 4 are equations through which an upper torque limit may be determined using all of a roll angle $\varphi$, a roll angle change rate p, and vertical load information.

$$\text{inner-wheel upper torque limit} = \sigma_0 \times \sigma_1 \times \qquad \text{[Equation 3]}$$
$$\text{min(left-wheel vertical load, right-wheel vertical load)} -$$
$$\sigma_2 \times |\varphi| - \sigma_3 \times \text{sign}(\varphi) \times p$$

$$\text{outer-wheel upper torque limit} = \sigma_0 \times \sigma_1 \times \qquad \text{[Equation 4]}$$
$$\text{max(left-wheel vertical load, right-wheel vertical load)} +$$
$$\sigma_2 \times |\varphi| + \sigma_3 \times \text{sign}(\varphi) \times p$$

In Equations 3 and 4, $\varphi$ is a roll angle and p is a roll angle change rate. Here, the roll angle $\varphi$ is defined as in FIG. 6.

Furthermore, $\sigma_0$ and $\sigma_1$ are the same as those in Equations 1 and 2, and $\sigma_2$ and $\sigma_3$ are coefficients that determine how much the roll angle $\varphi$ and the roll angle change rate are reflected to an upper torque limit and are set in the control unit. Furthermore, sign($\varphi$) is '+1' when $\varphi$ is a positive value and is '−1' when $\varphi$ is a negative value. Furthermore, | | is a symbol showing an absolute value.

The reason of determining an upper torque limit by taking the absolute value of the roll angle in Equations 3 and 3 is for reflecting the effect that when the vehicle inclines to any one of the left and right sides from the center in relation to the roll angle, the vertical load of the side decreases.

Furthermore, the reason of multiplying the roll angle change rate by sign($\varphi$) which is a value showing the direction of the roll angle to determine an upper torque limit is for decreasing the upper torque limit when the component of the roll angle change exists in the direction inclined away from the center and for increasing the upper torque limit when the component of the roll angle change rate exists in the direction returning to the center.

In another exemplary embodiment of the present disclosure, the upper torque limit may be expressed as the upper torque limit not at the inner side and outer side, but the left and right sides, which is as in the following Equations 5 and 6.

$$\text{left-wheel upper torque limit} = \qquad \text{[Equation 5]}$$
$$\sigma_0 \times \sigma_1 \times \text{left-wheel vertical load} - \sigma_2 \times \varphi - \sigma_3 \times p$$

$$\text{right-wheel upper torque limit} = \qquad \text{[Equation 6]}$$
$$\sigma_0 \times \sigma_1 \times \text{right-wheel vertical load} + \sigma_2 \times \varphi + \sigma_3 \times p$$

Figure 6:
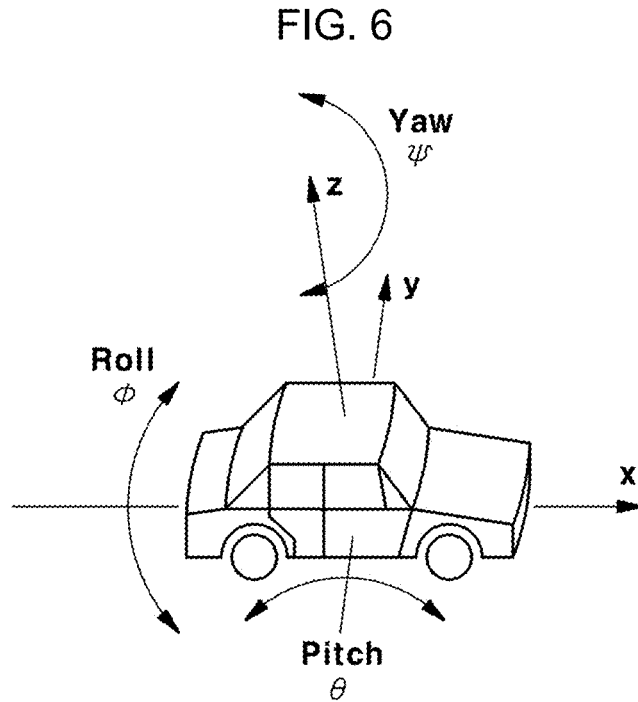
FIG. 6 is a view showing a coordinate frame and a roll angle of a vehicle.

The behavior direction of a vehicle follows the ISO vehicle coordinate frame shown in FIG. 6. The signs in Equations 5 and 6 are the same as those in Equations 3 and 4.

One of the roll angle and the roll angle change rate may not be used in determination of Equations 3 and 4 and Equations 5 and 6. That is, the terms '$\sigma_2 \times |\varphi|$' and '$\sigma_2 \times 9$' may be removed in the equations. Alternatively, That is, the terms '$\sigma_3 \times \text{sign}(\varphi) \times p$' and '$\sigma_3 \times p$' may be removed in the equations.

The following Equations 7 and 8 are examples for removing the term '$\sigma_3 \times \text{sign}(\varphi) \times p$' in the Equations 3 and 4.

$$\text{inner-wheel upper torque limit} = \sigma_0 \times \sigma_1 \times \qquad \text{[Equation 7]}$$
$$\text{min(left-wheel vertical load, right-wheel vertical load)} -$$
$$\sigma_2 \times |\varphi|$$

$$\text{outer-wheel upper torque limit} = \sigma_0 \times \sigma_1 \times \qquad \text{[Equation 8]}$$
$$\text{max(left-wheel vertical load, right-wheel vertical load)} +$$
$$\sigma_2 \times |\varphi|$$

The following Equations 9 and 10 are examples for removing the term '$\sigma_2 \times |\varphi|$' in the Equations 3 and 4.

$$\text{inner-wheel upper torque limit} = \sigma_0 \times \sigma_1 \times \qquad \text{[Equation 9]}$$
$$\text{min(left-wheel vertical load, right-wheel vertical load)} -$$
$$\sigma_3 \times \text{sign}(\varphi) \times p$$

$$\text{outer-wheel upper torque limit} = \sigma_0 \times \sigma_1 \times \qquad \text{[Equation 10]}$$
$$\text{max(left-wheel vertical load, right-wheel vertical load)} +$$
$$\sigma_3 \times \text{sign}(\varphi) \times p$$

The following Equations 11 and 12 are examples for removing the term 'σ3×p' in the Equations 5 and 6.

$$\text{left-wheel upper torque limit} = \qquad \text{[Equation 11]}$$
$$\sigma_0 \times \sigma_1 \times \text{left-wheel vertical load} - \sigma_2 \times \varphi$$

$$\text{right-wheel upper torque limit} = \qquad \text{[Equation 12]}$$
$$\sigma_0 \times \sigma_1 \times \text{right-wheel vertical load} + \sigma_2 \times \varphi$$

The following Equations 13 and 14 are examples for removing the term 'σ2×φ' in the Equations 5 and 6.

$$\text{left-wheel upper torque limit} = \qquad \text{[Equation 13]}$$
$$\sigma_0 \times \sigma_1 \times \text{left-wheel vertical load} - \sigma_3 \times p$$

$$\text{right-wheel upper torque limit} = \qquad \text{[Equation 14]}$$
$$\sigma_0 \times \sigma_1 \times \text{right-wheel vertical load} + \sigma_3 \times p$$

After the upper torque limit for each wheel is obtained, as described above, the controller unit is configured to compare the torque command for each wheel (pre-correction torque commands) determined from the real-time basic torque command with the upper torque limit (S14 in FIG. 2A) and corrects the torque command (pre-correction torque command) of any one of the left wheel and the right wheel (or the inner wheel and the outer wheel) not to exceed the upper torque limit of the corresponding wheel so that the final torque command (post-correction torque command) does not exceed the upper torque limit (S15 in FIG. 2A). Furthermore, torque correction control that controls the operation of the driving device 40 (which may be a motor configured for each wheel) is performed so that torque for each wheel is applied in accordance with the post-correction torque command.

In the exemplary embodiment of FIG. 2B, when the vertical load of each wheel, that is, the vertical loads of the left wheel and the right wheel (or the inner wheel and the outer wheel) are determined, a power distribution ratio may be determined as the ratio of the vertical loads of the wheels. Alternatively, when an upper torque limit of each wheel, that is, the upper torque limits of the left wheel and the right wheel (or the inner wheel and the outer wheel) are determined through the equations described above, a power distribution ratio may be determined as the ratio of the upper torque limits of the wheels.

In more detail, a power distribution ratio for distributing the basic torque command as a left-wheel torque command and a right-wheel torque command may be determined as the ratio of the left-wheel vertical load and the right-wheel vertical load. Alternatively, since the left-wheel upper torque limit and the right-wheel upper torque limit may be determined through the equations by including the left-wheel vertical load and the right-wheel vertical load as input, the ratio of the left-wheel vertical load and the right-wheel vertical load may be the same as the ratio of the left-wheel upper torque limit and the right-wheel upper torque limit. Accordingly, the power distribution ratio of the left wheel and the right wheel may be determined as the ratio of the left-wheel upper torque limit and the right-wheel upper torque limit.

That is, when the control unit determines the left-wheel upper torque limit from the left-wheel vertical load and the right-wheel upper torque limit from the right-wheel vertical load, the ratio of the left-wheel upper torque limit and the right-wheel upper torque limit may be the power distribution ratio for distributing driving forces (torque) of the left wheel and the right wheel.

Figure 7:
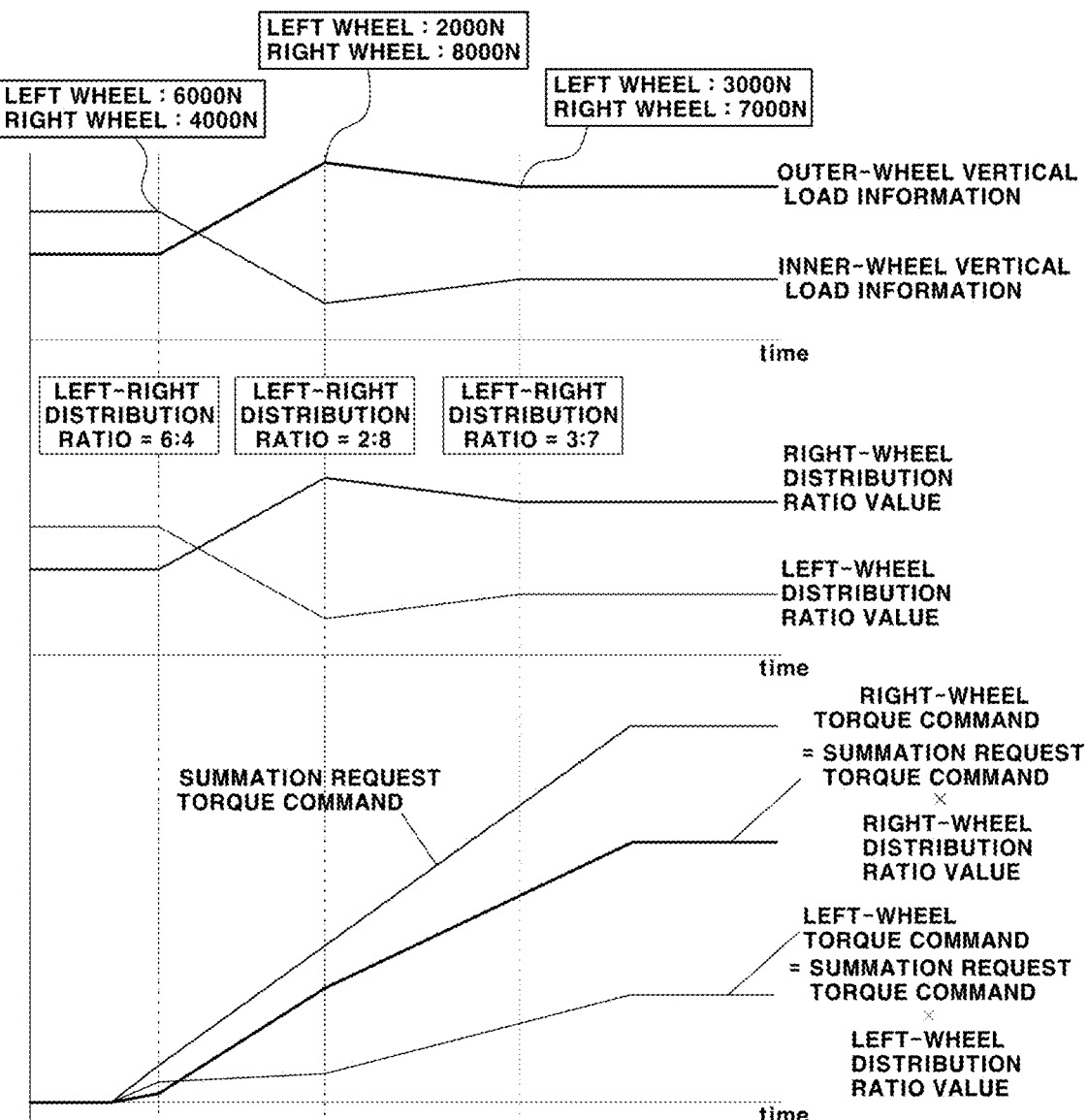
FIG. 7 is a view exemplifying the state in which a left and right power distribution ratio is changed in real time in accordance with vertical load information in the present disclosure.

FIG. 7 is a view exemplifying the state in which a left and right power distribution ratio is changed in real time in accordance with vertical load information in the present disclosure. In FIG. 7, the 'summation request torque command', which is an instruction value for driver-requiring torque, is a basic torque command which is determined in a control unit (first control unit) in accordance with vehicle driving information such as an accelerator pedal input value by a driver.

Referring to FIG. 7, it may be seen that when the left-wheel vertical load and the right-wheel vertical load are changed, the power distribution ratio for the left wheel and the right wheel is also changed in real time, and in the instant case, the ratio of the left-wheel vertical load and the right-wheel vertical load may be determined as the power distribution ratio. Furthermore, when the power distribution ratio is determined the left-wheel torque command may be determined as the product of the summation request torque command (or the basic torque command) and the left-wheel distribution ratio valve, and the right-wheel torque command may be determined as the product of the summation request torque command and the right-wheel distribution ratio value.

The sum of the left-wheel distribution ratio valve and the right-wheel distribution ratio value is 1. For example, when the power distribution ratio of the left wheel and the right wheel is 6:4, the left-wheel distribution ratio valve is 0.6 and the right-wheel distribution ratio value is 0.4. When the power distribution ratio of the left wheel and the right wheel is 2:8, the left-wheel distribution ratio valve is 0.2 and the right-wheel distribution ratio value is 0.8.

When the control unit determines the left-wheel torque command the right-wheel torque command, these are final torque commands and the torque vectoring apparatus is controlled so that torque corresponding to the final torque commands is applied to the left wheel and the right wheel. Furthermore, if a separate torque vectoring performing condition considering drivability, energy efficiency, etc. is set in advance in the control unit, as in S14' shown in FIG. 2B, the control unit may determine whether the performing condition is satisfied, and then may perform torque vectoring control that utilizes a power distribution ratio determined from the real-time vertical load information only when determining that the performing condition is satisfied.

The driving force control method according to an exemplary embodiment of the present disclosure was described in detail above. According to the driving force control method of the present disclosure, it is possible to prevent an excessive roll and stably secure a lateral grounding force of a tire by performing torque vectoring control considering a real-time lateral vertical load change before a slip is generated. Furthermore, it is possible to achieve a roll damping effect through the driving force control method considering a real-time vertical load change and roll dynamics. That is, roll overshoot (fluctuation) may be prevented. These effects of the present disclosure are increased in a Sports Utility Vehicle (SUV) in which the distance between the center of gravity and the roll center is large.

In various exemplary embodiments of the present disclosure, a controller is connected to at least one of the elements of the heat pump system 10 such as the control valve 30 but not limited thereto, to control the operations thereof.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

The scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling a driving force of a vehicle, the method comprising:

determining, by a control unit, a basic torque command for a driving device configured to drive the vehicle, based on vehicle driving information as obtained while the vehicle is traveling;

obtaining, by the control unit, real-time vertical load information of a left wheel and a right wheel of the vehicle while the vehicle is traveling based on information collected from the vehicle while the vehicle is traveling;

determining, by the control unit, final wheel-specific torque commands, based on the basic torque command as determined and the real-time vertical load information as obtained, to be applied to the left wheel and the right wheel, respectively; and controlling, by the control unit, a torque vectoring apparatus including the driving device so that a predetermined torque considering the real-time vertical load information before a slip is generated is applied, respectively, to the left wheel and the right wheel according to the final wheel-specific torque commands, wherein the determining of final wheel-specific torque commands includes:

determining a torque command for each of the left wheel and the right wheel in accordance with a power distribution ratio of the left wheel and the right wheel which are determined from the basic torque command as determined while the vehicle is traveling;

determining a left-wheel upper torque limit and a right-wheel upper torque limit based on the obtained real-time vertical load information; and determining a final left-wheel torque command and a final right-wheel torque command so as not to exceed the determined left-wheel upper torque limit and right-wheel upper torque limit, respectively, from the left-wheel torque command and the right-wheel torque command determined in accordance with the power distribution ratio, and wherein, in the determining of the left-wheel upper torque limit and the right-wheel upper torque limit, upper torque limits of an inner wheel and an outer wheel of the left wheel and the right wheel while the vehicle is turning are determined through following equations:

$$\text{inner-wheel upper torque limit} = \sigma 0 \times \sigma 1 \times$$

$$\min(\text{left-wheel vertical load, right-wheel vertical load}) - \sigma 2 \times |\varphi|$$

$$\text{outer-wheel upper torque limit} = \sigma 0 \times \sigma 1 \times$$

$$\max(\text{left-wheel vertical load, right-wheel vertical load}) + \sigma 2 \times |\varphi|$$

where σ0 is a coefficient of a value set in advance in the control unit to convert load information into a torque value, σ1 is a parameter value determined by the control unit in correspondence to a maximum road surface friction coefficient of a road surface on which the vehicle is traveling, σ2 is a coefficient of a value set in advance in the control unit, and φ is a roll angle which is real-time roll motion information of the vehicle which is obtained from the information collected from the vehicle.

2. A method of controlling a driving force of a vehicle, the method comprising:

determining, by a control unit, a basic torque command for a driving device configured to drive the vehicle, based on vehicle driving information as obtained while the vehicle is traveling;

obtaining, by the control unit, real-time vertical load information of a left wheel and a right wheel of the vehicle while the vehicle is traveling based on information collected from the vehicle while the vehicle is traveling;

determining, by the control unit, final wheel-specific torque commands, based on the basic torque command as determined and the real-time vertical load information as obtained, to be applied to the left wheel and the right wheel, respectively; and controlling, by the control unit, a torque vectoring apparatus including the driving device so that a predetermined torque considering the real-time vertical load information before a slip is generated is applied, respectively, to the left wheel and the right wheel according to the final wheel-specific torque commands, wherein the determining of the final wheel-specific torque commands includes:

determining a torque command for each of the left wheel and the right wheel in accordance with a power distribution ratio of the left wheel and the right wheel which are determined from the basic torque command as determined while the vehicle is traveling;

determining a left-wheel upper torque limit and a right-wheel upper torque limit based on the obtained real-time vertical load information; and determining a final left-wheel torque command and a final right-wheel torque command so as not to exceed the determined left-wheel upper torque limit and right-wheel upper torque limit, respectively, from the left-wheel torque command and the right-wheel torque command determined in accordance with the power distribution ratio, and wherein, in the determining of the left-wheel upper torque limit and the right-wheel upper torque limit, an upper torque limit of an inner wheel of the left wheel and the right wheel while the vehicle is turning and an upper torque limit of an outer wheel while the vehicle is turning are determined through following equations:

$$\text{inner-wheel upper torque limit} =$$

$$\sigma 0 \times \sigma 1 \times \min(\text{left-wheel vertical load, right-wheel vertical load}) -$$

$$\sigma 3 \times \text{sign}(\varphi) \times p;$$

$$\text{outer-wheel upper torque limit} =$$

$$\sigma 0 \times \sigma 1 \times \max(\text{left-wheel vertical load, right-wheel vertical load}) +$$

$$\sigma 3 \times \text{sign}(\varphi) \times p,$$

where σ0 is a coefficient of a value set in advance in the control unit to convert load information into a torque value, σ1 is a parameter value determined by the control unit in correspondence to a maximum road surface friction coefficient of a road surface on which the vehicle is driven, σ3 is a coefficient of a value set in the control unit, p is a roll angle change rate, and φ is a roll angle which is real-time roll motion information of the vehicle which is obtained from the information collected from the vehicle.

3. A method of controlling a driving force of a vehicle, the method comprising:

determining, by a control unit, a basic torque command for a driving device configured to drive the vehicle, based on vehicle driving information as obtained while the vehicle is traveling;

obtaining, by the control unit, real-time vertical load information of a left wheel and a right wheel of the vehicle while the vehicle is traveling based on information collected from the vehicle while the vehicle is traveling;

determining, by the control unit, final wheel-specific torque commands, based on the basic torque command as determined and the real-time vertical load information as obtained, to be applied to the left wheel and the right wheel, respectively; and controlling, by the control unit, a torque vectoring apparatus including the driving device so that a predetermined torque considering the real-time vertical load information before a slip is generated is applied, respectively, to the left wheel and the right wheel according to the final wheel-specific torque commands, wherein the determining of final wheel-specific torque commands includes:

determining a torque command for each of the left wheel and the right wheel in accordance with a power distribution ratio of the left wheel and the right wheel which are determined from the basic torque command as determined while the vehicle is traveling;

determining a left-wheel upper torque limit and a right-wheel upper torque limit based on the obtained real-time vertical load information; and determining a final left-wheel torque command and a final right-wheel torque command so as not to exceed the determined left-wheel upper torque limit and right-wheel upper torque limit, respectively, from the left-wheel torque command and the right-wheel torque command determined in accordance with the power distribution ratio, and wherein, in the determining of the left-wheel upper torque limit and the right-wheel upper torque limit, the left-wheel upper torque limit and the right-wheel upper torque limit are determined through the following equations:

left–wheel upper torque limit =

$$\sigma 0 \times \sigma 1 \times \text{left–wheel vertical load} - \sigma 2 \times \varphi - \sigma 3 \times p;$$

right–wheel upper torque limit =

$$\sigma 0 \times \sigma 1 \times \text{right–wheel vertical load} + \sigma 2 \times \varphi + \sigma 3 \times p,$$

where $\sigma 0$ is a coefficient of a value set in advance in the control unit to convert load information into a torque value, $\sigma 1$ is a parameter value determined by the control unit in correspondence to a maximum road surface friction coefficient of a road surface on which the vehicle is driven, $\sigma 2$ and $\sigma 3$ are coefficients of values set in the control unit, p is a roll angle change rate, and $\varphi$ is a roll angle which is real-time roll motion information of the vehicle which is obtained from the information collected from the vehicle.

4. A method of controlling a driving force of a vehicle, the method comprising:

determining, by a control unit, a basic torque command for a driving device configured to drive the vehicle, based on vehicle driving information as obtained while the vehicle is traveling;

obtaining, by the control unit, real-time vertical load information of a left wheel and a right wheel of the vehicle while the vehicle is traveling based on information collected from the vehicle while the vehicle is traveling;

determining, by the control unit, final wheel-specific torque commands, based on the basic torque command as determined and the real-time vertical load information as obtained, to be applied to the left wheel and the right wheel, respectively; and controlling, by the control unit, a torque vectoring apparatus including the driving device so that a predetermined torque considering the real-time vertical load information before a slip is generated is applied, respectively, to the left wheel and the right wheel according to the final wheel-specific torque commands, wherein the determining of the final wheel-specific torque commands includes:

determining a torque command for each of the left wheel and the right wheel in accordance with a power distribution ratio of the left wheel and the right wheel which are determined from the basic torque command as determined while the vehicle is traveling;

determining a left-wheel upper torque limit and a right-wheel upper torque limit based on the obtained real-time vertical load information; and determining a final left-wheel torque command and a final right-wheel torque command so as not to exceed the determined left-wheel upper torque limit and right-wheel upper torque limit, respectively, from the left-wheel torque command and the right-wheel torque command determined in accordance with the power distribution ratio, and wherein, in the determining of the left-wheel upper torque limit and the right-wheel upper torque limit, the left-wheel upper torque limit and the right-wheel upper torque limit are determined through the following equations:

left–wheel upper torque limit =

$$\sigma 0 \times \sigma 1 \times \text{left–wheel vertical load} - \sigma 2 \times \varphi;$$

right–wheel upper torque limit =

$$\sigma 0 \times \sigma 1 \times \text{right–wheel vertical load} + \sigma 2 \times \varphi + \sigma 3 \times \varphi,$$

where $\sigma 0$ is a coefficient of a value set in advance in the control unit to convert load information into a torque value, $\sigma 1$ is a parameter value determined by the control unit in correspondence to a maximum road surface friction coefficient of a road surface on which the vehicle is driven, $\sigma 2$ is a coefficient of a value set in advance in the control unit, and $\varphi$ is a roll angle which is real-time roll motion information of the vehicle which is obtained from the information collected from the vehicle.

5. A method of controlling a driving force of a vehicle, the method comprising:

determining, by a control unit, a basic torque command for a driving device configured to drive the vehicle, based on vehicle driving information as obtained while the vehicle is traveling;

obtaining, by the control unit, real-time vertical load information of a left wheel and a right wheel of the vehicle while the vehicle is traveling based on information collected from the vehicle while the vehicle is traveling;

determining, by the control unit, final wheel-specific torque commands, based on the basic torque command as determined and the real-time vertical load information as obtained, to be applied to the left wheel and the right wheel, respectively; and controlling, by the control unit, a torque vectoring apparatus including the driving device so that a predetermined torque considering the real-time vertical load information before a slip is generated is applied, respectively, to the left wheel and the right wheel according to the final wheel-specific torque commands, wherein the determining of the final wheel-specific torque commands includes:

determining a torque command for each of the left wheel and the right wheel in accordance with a power distribution ratio of the left wheel and the right wheel which are determined from the basic torque command as determined while the vehicle is traveling;

determining a left-wheel upper torque limit and a right-wheel upper torque limit based on the obtained real-time vertical load information; and determining a final left-wheel torque command and a final right-wheel torque command so as not to exceed the determined left-wheel upper torque limit and right-wheel upper torque limit, respectively, from the left-wheel torque command and the right-wheel torque command determined in accordance with the power distribution ratio, and wherein, in the determining of the left-wheel upper torque limit and the right-wheel upper torque limit, the left-wheel upper torque limit and the right-wheel upper torque limit are determined through the following equations:

left−wheel upper torque limit =

$$\sigma 0 \times \sigma 1 \times \text{left−wheel vertical load} - \sigma 3 \times p;$$

right−wheel upper torque limit =　　　　　　　　　5

$$\sigma 0 \times \sigma 1 \times \text{right−wheel vertical load} + \sigma 2 \times \varphi + \sigma 3 \times p,$$

where σ0 is a coefficient of a value set in advance in the
control unit to convert load information into a torque　10
value, σ1 is a parameter value determined by the
control unit in correspondence to a maximum road
surface friction coefficient of a road surface on which
the vehicle is driven, σ3 is a coefficient of a value set
in advance in the control unit, and p is a roll angle　15
change rate.

* * * * *